(12) United States Patent
Kano et al.

(10) Patent No.: US 10,169,496 B2
(45) Date of Patent: Jan. 1, 2019

(54) SPRINGBACK AMOUNT EVALUATION METHOD

(71) Applicant: JFE STEEL CORPORATION, Tokyo (JP)

(72) Inventors: Hirotaka Kano, Tokyo (JP); Osamu Sonobe, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 518 days.

(21) Appl. No.: 14/418,869

(22) PCT Filed: Sep. 27, 2013

(86) PCT No.: PCT/JP2013/076402
§ 371 (c)(1),
(2) Date: Jan. 30, 2015

(87) PCT Pub. No.: WO2014/069136
PCT Pub. Date: May 8, 2014

(65) Prior Publication Data
US 2015/0205892 A1 Jul. 23, 2015

(30) Foreign Application Priority Data

Oct. 30, 2012 (JP) .................................. 2012-238497

(51) Int. Cl.
*G06F 17/50* (2006.01)
*B21D 22/00* (2006.01)
(Continued)

(52) U.S. Cl.
CPC ......... *G06F 17/5009* (2013.01); *B21D 22/00* (2013.01); *B21J 5/00* (2013.01);
(Continued)

(58) Field of Classification Search
CPC ..... G06F 17/5009; G06F 17/11; B21D 22/00; B21J 5/00; B21K 7/12
(Continued)

(56) References Cited

U.S. PATENT DOCUMENTS 3,944,798 A * 3/1976 Eaton ....................... G01B 7/28
 33/1 M
6,810,352 B2 10/2004 Sasahara
(Continued)

FOREIGN PATENT DOCUMENTS

| JP | 2003-157299 A | 5/2003 |
| JP | 2007-130670 A | 5/2007 |
| JP | 2007-229724 A | 9/2007 |

OTHER PUBLICATIONS

LEI, "Rebound Characteristics and Control Methods of High-Strength Steel Twisted," National Knowledge—Engineering Science, Series I, Section 7, Jul. 2012.
(Continued)

*Primary Examiner* — Andre Pierre Louis
(74) *Attorney, Agent, or Firm* — Oliff PLC

(57) ABSTRACT

A springback amount evaluation method evaluates an amount of springback after die release of a press forming product by a computer and includes: setting a plurality of section planes intersecting a shape of the press forming product at predetermined intervals; obtaining a sectional shape of the press forming product for each of the set section planes; and obtaining an orientation of each of the sectional shapes in each section plane as a direction of the each of the sectional shapes, wherein for each of a shape to be a reference of the press forming product and a shape after the die release, the above-described three steps are performed, and the amount of springback is evaluated by comparing, for all of the section planes, the obtained directions of the
(Continued)

sectional shapes for the shape to be the reference and for the shape after the die release.

10 Claims, 11 Drawing Sheets

(51) Int. Cl.
    *B21J 5/00*     (2006.01)
    *B21K 7/12*     (2006.01)
    *G06F 17/11*     (2006.01)

(52) U.S. Cl.
    CPC ............... *B21K 7/12* (2013.01); *G06F 17/11* (2013.01); *G06F 2217/16* (2013.01); *G06F 2217/41* (2013.01)

(58) Field of Classification Search
    USPC .............................................. 703/2
    See application file for complete search history.

(56) References Cited

U.S. PATENT DOCUMENTS

| | | | |
|---|---|---|---|
| 6,962,631 B2* | 11/2005 | Sugiura | C21D 1/185 148/320 |
| 7,194,388 B2* | 3/2007 | Chu | B21D 37/20 700/178 |
| 2010/0005645 A1* | 1/2010 | Bertin | B82Y 10/00 29/592.1 |
| 2014/0172391 A1* | 6/2014 | Tokita | G06F 17/5018 703/2 |
| 2014/0356643 A1* | 12/2014 | Nakata | B21D 22/26 428/603 |
| 2015/0298197 A1* | 10/2015 | Yoshida | B21D 5/01 72/373 |

OTHER PUBLICATIONS

Nov. 3, 2015 Office Action issued in Chinese Patent Application No. 201380055456.1

Jun. 3, 2016 Extended Search Report issued in European Patent Application No. 13852155.4.

May 6, 2016 Search Report issued in Chinese Patent Application No. 201380055456.1.

Jan. 14, 2014 International Search Report issued in International Application No. PCT/JP2013/076402.

* cited by examiner

SPRINGBACK AMOUNT EVALUATION METHOD

FIELD

The present invention relates to a springback amount evaluation method of evaluating an amount of springback of a press forming product after die release, the press forming product being manufactured by press forming a metal sheet.

BACKGROUND

Many of parts for automobiles are manufactured by press forming a steel sheet, which is one of metal sheets. In recent years, since thinner steel sheets are used in order to reduce weights of parts for automobiles, there is a need for their higher strength. However, the higher strength creates a problem that deformation from a desired shape is increased due to springback after press forming, and thus countermeasures against the springback become necessary.

"Metal sheet" herein means a hot rolled steel sheet, a cold rolled steel sheet, or a surface treated steel sheet resulting from a surface treatment (an electro-galvanizing process, a hot-dip galvanizing process, an organic coating process, or the like) on the steel sheet. Further, a metal sheet may be a sheet made of any of various metals, such as a ferritic stainless steel, an austenitic stainless steel, an aluminum alloy, or a magnesium alloy.

At present, for a countermeasure against springback, numerical simulation by a finite element method (hereinafter, FEM) is used the most. An example of a countermeasure against springback using a numerical simulation by an FEM is as follows. First, a springback analysis by an FEM is performed, and based on a result of the springback analysis, a factorial analysis of the springback is performed. Next, based on a result of the springback factorial analysis, a countermeasure is implemented, and effects of the implementation of the countermeasure are checked by the FEM again. This procedure is repeated until a desired shape is obtained, and thereafter, an actual die of press forming is manufactured.

As a factorial analysis of springback by an FEM, there is, for example, a method disclosed in Patent Literature 1. The factorial analysis of springback of Patent Literature 1 clarifies an influence exerted on springback by a residual stress acting on a press forming product (before die release) after a press forming analysis. Specifically, by this technique, a springback analysis result, which is obtained by performing a springback analysis by partially changing a residual stress distribution after the press forming analysis, is compared with a springback analysis result obtained by performing a springback analysis without changing the residual stress distribution. Thereby, an influence of the changed residual stress distribution is checked. If, as a result of doing this, an influence of a residual stress of a particular portion is able to be clarified, and the influence is identified as affecting the springback, countermeasures against the springback are able to be planned.

As a countermeasure against springback, for example, there is a method of giving, by adding a new shape to a press forming product, a tensile stress to that portion that has been added with the shape. Or, for press forming products manufactured by performing two steps of press working, there is a method or the like of giving a compressive stress thereto by adding an embossed or bead shape in the first step and thereafter crushing and stretching that shape in the second step.

For implementation of such a countermeasure against springback, how a modification is performed to which part of a press forming product is important. In order to clarify the part of the press forming product where the modification is performed and the method of the modification, it is important to evaluate the amount of springback correctly. In general, an amount of springback is evaluated after specifying a portion of a press forming product and determining an index, such as an evaluation direction or the like.

Deformation due to springback is roughly classified into camber, torsion, and sectional opening (closing). Of these, as to the sectional opening, the deformation itself is easy to be understood, and is comparatively easy to be dealt with by putting a forecast in the die beforehand. However, since camber and torsion occur in a combined manner in actual springback, it is more difficult to determine an index for evaluating the amount of the springback. In particular, if a part is large, dealing with them by putting a forecast in the die beforehand is often difficult. Therefore, it is important to clearly evaluate each of the camber and torsion quantitatively. However, torsion is particularly difficult to be evaluated quantitatively, and thus clarifying an index for the evaluation is also difficult.

Accordingly, as a conventional technique focused on torsion, for example, a method of calculating a center of gravity in an evaluated section and calculating a torsional torque of the section corresponding to rotation of the section about that center of gravity is disclosed in Patent Literature 2. By this technique, torsion is solved by eliminating the torsional torque causing the torsion.

CITATION LIST

Patent Literature 1: Japanese Patent Application Laid-open No. 2007-229724
Patent Literature 2: Japanese Patent Application Laid-open No. 2007-130670

SUMMARY

Technical Problem

However, by the springback factorial analysis method disclosed in Patent Literature 1, factors of springback are able to be found clearly, but the part of the press forming product where modification is to be performed and the method of the modification are not necessarily clarified.

Further, the index for evaluating the amount of springback is determined by a skilled operator, but under the present circumstances, the indices differ from one operator to another. Therefore, there is a problem that the index for evaluating the amount of springback is not an objective one.

Further, the method described in Patent Literature 2 has a problem that press forming by which the torsional torque is actually eliminated completely is difficult, and to what extent the torsion has actually occurred in a part after springback is difficult to be found.

The present invention has been made in order to solve problems as described above and an object thereof is to obtain a springback amount evaluation method of evaluating an amount of springback based on an objective index independently of judgment by an operator.

Solution to Problem

A springback amount evaluation method according to the present invention evaluates an amount of springback after die release of a press forming product by a computer and includes: a section plane setting step of setting a plurality of section planes intersecting a shape of the press forming product at predetermined intervals; a sectional shape obtaining step of obtaining a sectional shape of the press forming product for each of the set section planes; and a sectional shape direction obtaining step of obtaining an orientation of each of the sectional shapes in each section plane as a direction of the each of the sectional shapes, wherein for each of a shape to be a reference of the press forming product and a shape after the die release, the section plane setting step, the sectional shape obtaining step, and the sectional shape direction obtaining step are performed, and the amount of springback is evaluated by comparing, for all of the section planes, the obtained directions of the sectional shapes for the shape to be the reference and for the shape after the die release.

A springback amount evaluation method according to the present invention evaluates an amount of springback after die release of a press forming product by a computer and includes: a section plane setting step of setting a plurality of section planes intersecting a shape of the press forming product at predetermined intervals; a sectional shape obtaining step of obtaining a sectional shape of the press forming product for each of the set section planes; and a position identifying point coordinate obtaining step of obtaining a position identifying point coordinate where a position of the each of the sectional shapes in each section plane is identified, wherein for each of a shape to be a reference of the press forming product and a shape after the die release, the section plane setting step, the sectional shape obtaining step, and the position identifying point coordinate obtaining step are performed, and the amount of springback is evaluated by comparing, for all of the section planes, the obtained position identifying point coordinates for the shape to be the reference and the shape after the die release.

In the above-described springback amount evaluation method according to the present invention, the shape to be the reference of the press forming product is any one of a shape of the press forming product before the die release, a shape of a die, or a targeted shape after press forming.

In the above-described springback amount evaluation method according to the present invention, the shape of the press forming product after the die release is a shape obtained as a result of performing a springback analysis on the press forming product, or a shape obtained as a result of actually performing press forming.

In the above-described springback amount evaluation method according to the present invention, a direction of the each of the sectional shapes in the each section plane is a direction in which a second moment of area in the sectional shape indicates a maximum value or minimum value, or a direction in which a section modulus in the sectional shape indicates a maximum value or minimum value.

In the above-described springback amount evaluation method according to the present invention, a direction of the each of the sectional shapes in the each section plane is a long side direction or a short side direction of a smallest rectangle circumscribing the sectional shape.

In the above-described springback amount evaluation method according to the present invention, the position identifying point is a coordinate of a center of gravity of the sectional shape.

In the above-described springback amount evaluation method according to the present invention, for 70% or more of the set plurality of section planes, a ratio of the maximum value of the second moment of area or section modulus to the minimum value thereof is equal to or greater than 1.1.

The present invention is an effective technique also for a material, such as, in particular, a high-strength steel sheet of the grade of 590 MPa or higher, or aluminum, which has a Young's modulus that is smaller than that of a steel based material.

Advantageous Effects of Invention

According to the present invention, independently of judgment by an operator, based on an objective index, an amount of springback is able to be evaluated, and thus an appropriate countermeasure against the springback is able to be implemented.

DESCRIPTION OF EMBODIMENTS

Figure 1:
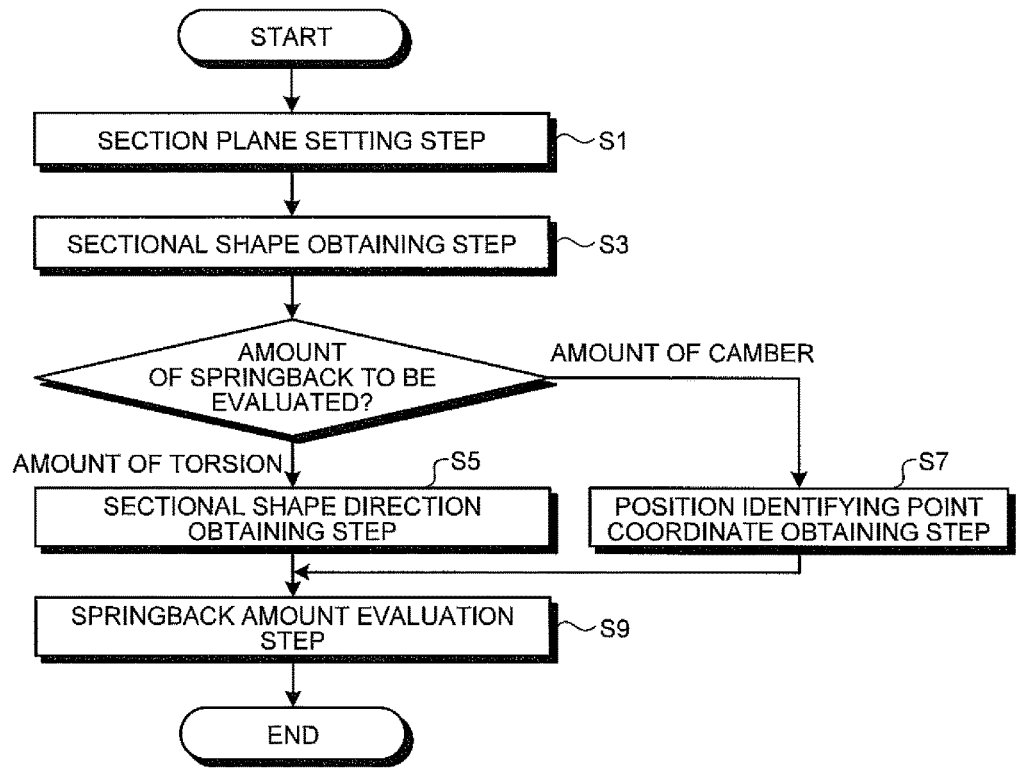
FIG. 1 is a flow chart illustrating a flow of a springback amount evaluation method according to an embodiment of the present invention.

In a springback amount evaluation method according to an embodiment of the present invention, when an amount of torsion is evaluated as an amount of springback, as illustrated in FIG. 1, a section plane setting step S1 and a sectional shape obtaining step S3 are implemented in this order. In the section plane setting step S1, for each of a shape to be a reference of a press forming product and a shape after die release, a plurality of planes are set at predetermined intervals in a predetermined direction of the press forming product, the plurality of planes being positions where amounts of springback of the press forming product are to be measured. In the sectional shape obtaining step S3, a sectional shape of the press forming product is obtained for each of the set section planes.

Steps implemented next differ depending on whether, as the amount of springback, an amount of torsion is evaluated or an amount of camber is evaluated. If an amount of torsion is evaluated as the amount of springback, a sectional shape direction obtaining step S5 of obtaining an orientation of each sectional shape as a direction of the sectional shape is implemented. "Torsion" is deformation by rotation of a press forming product about a certain axis. Further, if an amount of camber is evaluated as the amount of springback, instead of the sectional shape direction obtaining step S5, a position identifying point coordinate obtaining step S7 of obtaining coordinates of a position identifying point where a position of each sectional shape is identified is implemented.

Next, based on the obtained direction of each sectional shape or the coordinates of the position identifying point, an amount of torsion or an amount of camber of the whole press forming product is evaluated (springback amount evaluation step S9).

The above mentioned section plane setting step S1, the sectional shape obtaining step S3, the sectional shape direction obtaining step S5, and the position identifying point coordinate obtaining step S7 are executed by an apparatus, such as a personal computer (PC) or the like, which executes program processing. Thus, first, a configuration of an apparatus (hereinafter, referred to as "springback amount evaluation apparatus 1") will be schematically described, based on a block diagram illustrated in FIG. 2. The springback amount evaluation step S9 may be performed by an operator after graph display or the like is performed by the PC, or may be performed by separately providing a means for performing the springback amount evaluation step S9 in the PC and using that means. In this embodiment, an example in which an operator performs it by using the PC will be described.

Springback Amount Evaluation Apparatus

Figure 2:
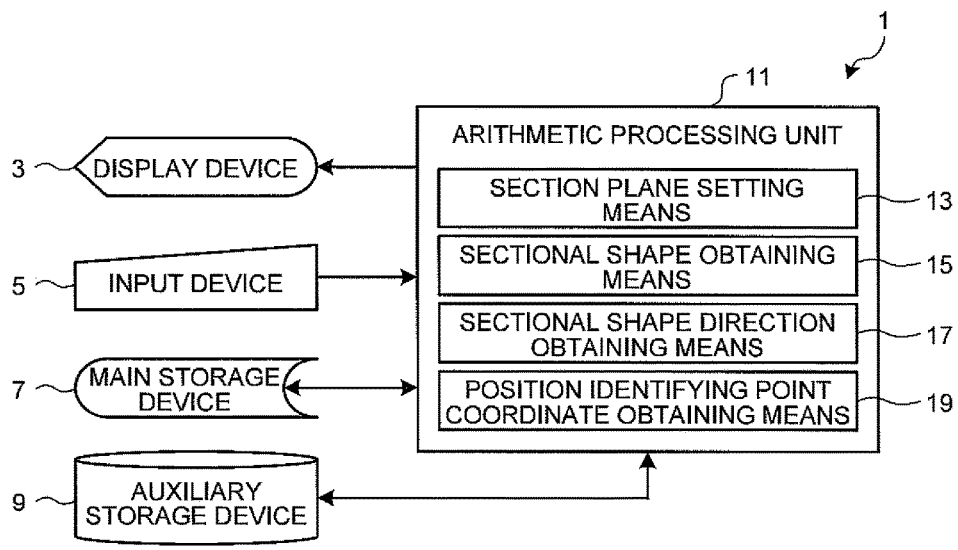
FIG. 2 is an explanatory diagram illustrating a springback amount evaluation apparatus according to the embodiment of the present invention.

The springback amount evaluation apparatus 1 according to the embodiment of the present invention is configured of the personal computer (PC) or the like, and as illustrated in FIG. 2, has a display device 3, an input device 5, a main storage device 7, an auxiliary storage device 9, and an arithmetic processing unit 11. The display device 3, the input device 5, the main storage device 7, and the auxiliary storage device 9 are connected to the arithmetic processing unit 11. These devices are controlled by commands of the arithmetic processing unit 11. The display device 3 is used in display or the like of results of calculations and is configured of a liquid crystal monitor or the like. The input device 5 is used in input or the like from an operator and is configured of a key board, a mouse, and the like. The main storage device 7 is used in temporary storage of data used by the arithmetic processing unit 11, computation, and the like, and is configured of a random-access memory or the like. The auxiliary storage device 9 is used in storage or the like of data, and is configured of a hard disk or the like.

The arithmetic processing unit 11 is configured of a CPU or the like of the PC or the like, and has, inside thereof, a section plane setting means 13, a sectional shape obtaining means 15, a sectional shape direction obtaining means 17, and a position identifying point coordinate obtaining means 19. These means are realized by the CPU or the like executing a predetermined program. These means will be described below.

Figure 3:
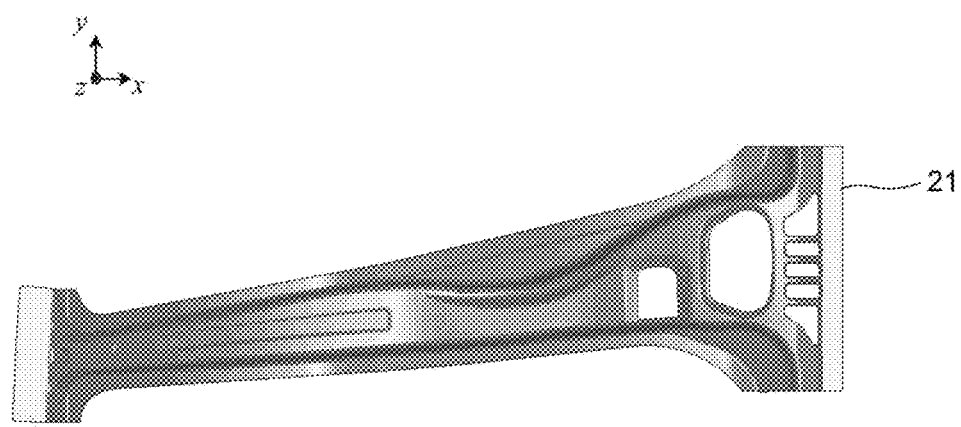
FIG. 3 is an explanatory diagram illustrating a press forming product to be evaluated by the springback amount evaluation method according the embodiment of the present invention.
Figure 4:
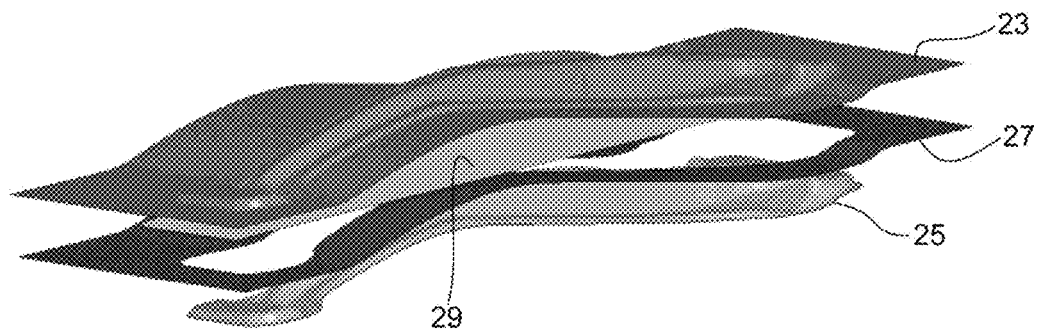
FIG. 4 is an explanatory diagram illustrating a method of press forming a press forming product of FIG. 3.
Figure 5A:
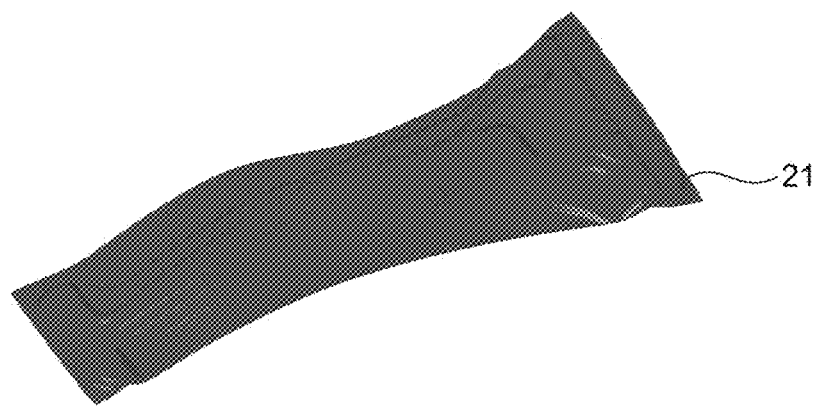
FIG. 5A is an explanatory diagram illustrating the method of press forming the press forming product of FIG. 3.
Figure 5B:
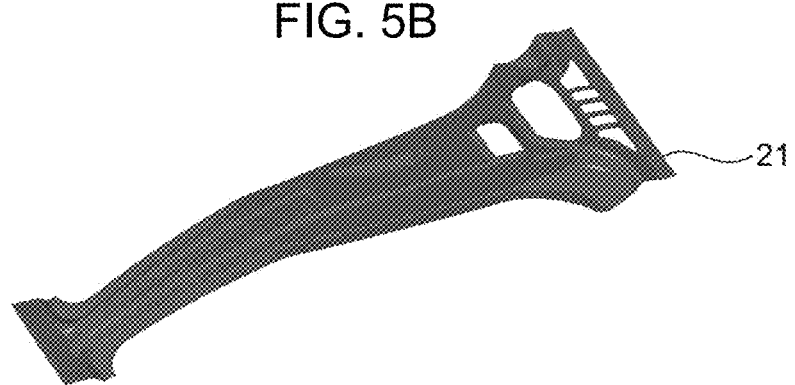
FIG. 5B is an explanatory diagram illustrating the method of press forming the press forming product of FIG. 3.

In the following description, as a target for which an amount of springback is to be evaluated, an outer part 21 of a center pillar illustrated in FIG. 3 will be described as an example. The outer part 21 is manufactured, as illustrated in FIG. 4, by press forming a blank material 29 by using a top die 23, a bottom die 25, and a blank holder 27. On the blank material 29, the first press forming (draw forming) is performed first (see FIG. 5A) and further, the second press forming (restrike) is performed by using another die. Next, unnecessary portions are cut off (by trimming) and a final shape of the outer part 21 is formed (see FIG. 5B). In the following description, as illustrated in FIG. 3, a longitudinal direction of the outer part 21 will be referred to as an x-direction, a width direction thereof as a y-direction, and a height direction thereof as a z-direction.

<Section Plane Setting Means>

The section plane setting means 13 sets a plurality of section planes intersecting a shape to be a reference of a press forming product (outer part 21) and a shape after die release that are targets, for which amounts of springback are evaluated, at predetermined intervals. As the shape to be the reference, a shape of the outer part 21 before the die release, a targeted shape after press forming of the outer part 21, or a shape of the die is used. The shape after the die release may be found by a springback analysis using a computer, or may be found by actually performing the press forming and finding the shape after the die release by three dimensional shape measurement or the like.

As a preliminary step for setting the section planes, the section plane setting means 13 sets a position where the shape to be the reference and the shape after the die release coincide with each other. As a result, for the shape to be the reference and the shape after the die release, section planes are able to be set at the same position. At the position where the shapes coincide with each other, the amount of springback is zero. In this embodiment, an x-direction position, −200 mm (see later described FIG. 10) of the outer part 21 is the position where the shapes coincide each other (longitudinal direction reference position).

Figure 6:
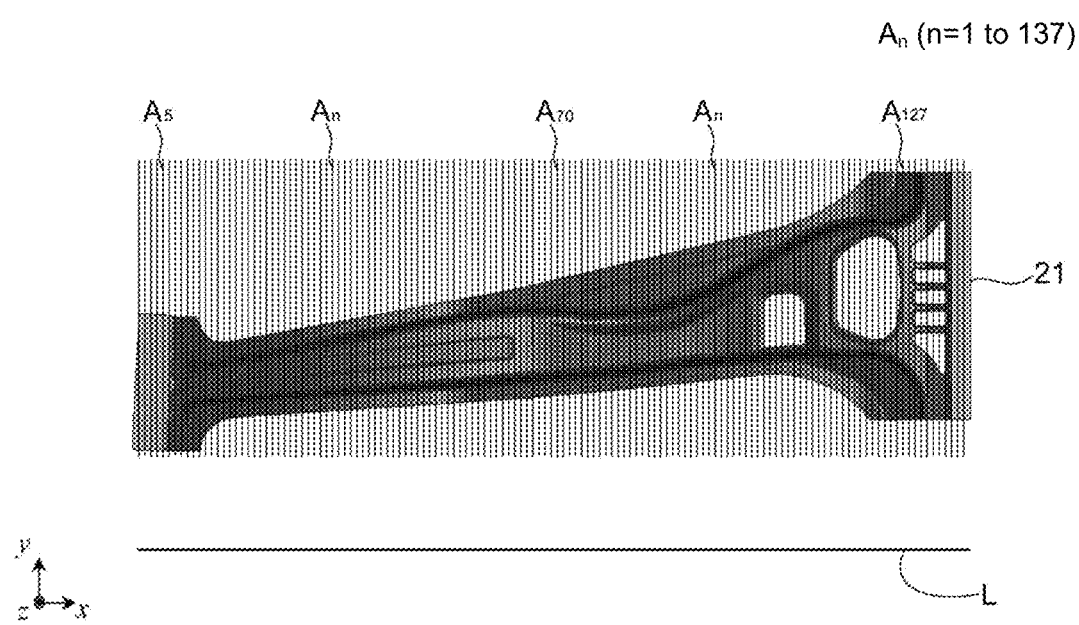
FIG. 6 is an explanatory diagram illustrating a section plane setting step of the springback amount evaluation method according to the embodiment of the present invention.

Next, a method of setting section planes in a press forming product will be described. In this embodiment, as an example of setting section planes, a reference axis "L" is set in parallel with the x-direction of the outer part 21, and as illustrated in FIG. 6, 137 section planes $A_n$ (n=1 to 137) orthogonal to the reference axis "L" are set at equal intervals on a y-z plane. In FIG. 6, respective section planes $A_n$ that have been set are illustrated with a plurality of straight lines parallel to the y-direction of the outer part 21. Further, in the following description, the section planes $A_n$ in FIG. 6 will be respectively referred to as section planes $A_1$ to $A_{137}$ from the left in FIG. 6.

<Sectional Shape Obtaining Means>

Figure 7A:
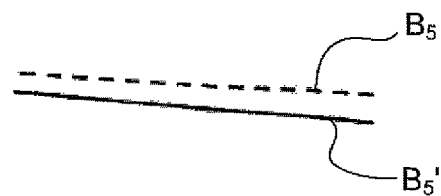
FIG. 7A is an explanatory diagram illustrating a sectional shape obtaining step of the springback amount evaluation method according to the embodiment of the present invention.
Figure 7B:
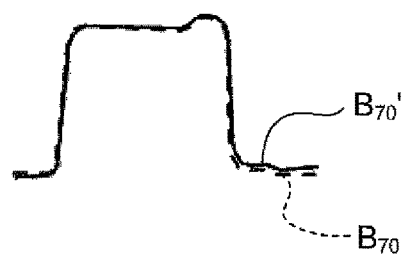
FIG. 7B is an explanatory diagram illustrating the sectional shape obtaining step of the springback amount evaluation method according to the embodiment of the present invention.
Figure 7C:
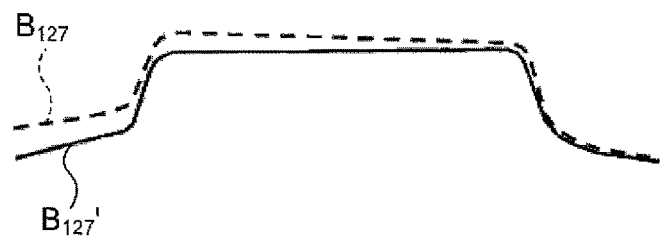
FIG. 7C is an explanatory diagram illustrating the sectional shape obtaining step of the springback amount evaluation method according to the embodiment of the present invention.

The sectional shape obtaining means 15 obtains a sectional shape of a press forming product for each of the set section planes. FIG. 7 are diagrams illustrating examples of sectional shapes of the outer part 21. These FIG. 7 illustrate, as examples, sectional shapes formed by the section plane $A_5$, the section plane $A_{70}$, and the section plane $A_{127}$, of the section planes $A_n$ (see FIG. 6) set for the outer part 21, intersecting with the outer part 21. In FIG. 7, the dotted line represents a sectional shape obtained for a shape of the outer part 21 before the die release and the solid line represents a sectional shape obtained for a shape of the outer part 21 after the die release. FIG. 7A is a diagram illustrating sectional shapes on the section plane $A_5$ (the sectional shape before the die release being referred to as "sectional shape $B_5$" and that after the die release as "sectional shape $B_5$'"). FIG. 7B is a diagram illustrating sectional shapes on the section plane $A_{70}$ (the sectional shape before the die release being referred to as "sectional shape $B_{70}$" and that after the die release as "sectional shape $B_{70}$'"). FIG. 7O is a diagram illustrating sectional shapes on the section plane $A_{127}$ (the sectional shape before the die release being referred to as "sectional shape $B_{127}$" and that after the die release as "sectional shape $B_{127}$'").

<Sectional Shape Direction Obtaining Means>

The sectional shape direction obtaining means 17 obtains, in order to evaluate an amount of torsion, for each sectional shape set by the sectional shape obtaining means 15, an orientation of that sectional shape in the section plane as a direction of that sectional shape. As described above, "torsion" is deformation by rotation of a press forming product about a certain axis. When this happens, each sectional shape of the press forming product rotates about the axis. Thus, by obtaining a rotational angle of each sectional shape, to what extent the torsion has occurred is able to be evaluated.

In order to obtain a rotational angle of each sectional shape, directions of the sectional shape before and after the torsion are respectively obtained, and the obtained directions of the sectional shape are compared to each other. Even if each sectional shape is deformed after the die release, in many cases, the amount of that deformation is not extremely large, and thus the influence exerted by the deformation of the sectional shape before and after the die release on the direction of that sectional shape is negligible. Therefore, by comparing directions of each sectional shape before and after the die release, the rotational angle of that sectional shape is able to be obtained.

By obtaining a rotational angle of each sectional shape for all of the sectional shapes, how much torsion has occurred in the press forming product is able to be found. The direction of each sectional shape may be perceived as an orientation of each sectional shape in each section plane. Therefore, in order to compare the directions of each sectional shape, orientations of each sectional shape in each section plane are obtained, and a change between these orientations between before and after the die release is obtained as a rotational angle. A direction of each sectional shape may be expressed by an angle formed between the sectional shape and a coordinate axis, for example.

An example of a direction of each sectional shape is a direction in which the second moment of area indicates the maximum value or minimum value, a direction in which the section modulus indicates the maximum value or minimum value, a long side direction or short side direction of the smallest rectangle circumscribing the sectional shape, or the like.

Description will be made on how the direction in which the second moment of area indicates the maximum value or minimum value is found as an example of a direction of each sectional shape. Values of the second moment of area of a sectional shape related to a certain axis on a section plane differ depending on in which direction that axis is set. Of these axes, the axis for which the second moment of area indicates the maximum value or minimum value is called "principal axis". Therefore, the principal axis direction is the direction in which the second moment of area indicates the maximum value or minimum value. The direction of this principal axis is found by using the following well known Equations (1) to (7). The second moments of area $I_y$, $I_z$, and $I_{yz}$ with respect to arbitrary orthogonal coordinate axes, a y-axis and a z-axis, which are set in the section are calculated as expressed by the following Equations (1) to (3). In these equations, "y" and "z" are distances from the center of gravity of the section, and "A" is an area of the section.

$$\begin{cases} I_y = \int_A z^2 dA & (1) \\ I_x = \int_A y^2 dA & (2) \\ I_{yz} = \int_A yz dA & (3) \end{cases}$$

The principal axis directions α1 and α2 in the section of the second moment of area are found by the following Equation (4) and the following Equation (5) as angles from the y-axis.

$$\begin{cases} \alpha_1 = \frac{1}{2}\tan^{-1}\frac{-2I_{yz}}{I_y - I_z} & (4) \\ \alpha_2 = \alpha_1 + \frac{\pi}{2} & (5) \end{cases}$$

The second moment of area related to the principal axis, that is, the principal second moment of area is given by the following Equation (6) and following Equation (7).

$$\begin{cases} I_1 = \frac{1}{2}\{(I_y + I_z) + \sqrt{(I_y - I_z)^2 + 4I_{yz}^2}\} & (6) \\ I_2 = \frac{1}{2}\{(I_y + I_z) - \sqrt{(I_y - I_z)^2 + 4I_{yz}^2}\} & (7) \end{cases}$$

Further, the direction in which the section modulus indicates the maximum value or minimum value, which is another example of a direction of each sectional shape, is found by the following method. The direction in which the section modulus indicates the maximum value is found by rotating the axis in the section little by little to change the direction. That is, the section modulus related to the axis is calculated every time the axis is rotated, and a direction of the axis indicating the maximum value in the results of the calculation is the direction in which the section modulus indicates the maximum value. More specifically, for example, by rotating the axis in the section degree by degree, the axis for which the section modulus becomes maximum is found, and by rotating the axis in the section by a finer angle around the axis, for example, 0.1 degree by 0.1 degree, the axis for which the section modulus becomes maximum is more accurately found. The direction in which the section modulus indicates the minimum value is found as a direction orthogonal to the direction in which the maximum value is indicated.

The direction in which the second moment of area indicates the maximum value or minimum value may be found by, other than the above method described by using the above Equations (1) to (7), a method similar to the method of finding the direction in which the section modulus indicates the maximum value or minimum value.

Figure 8:
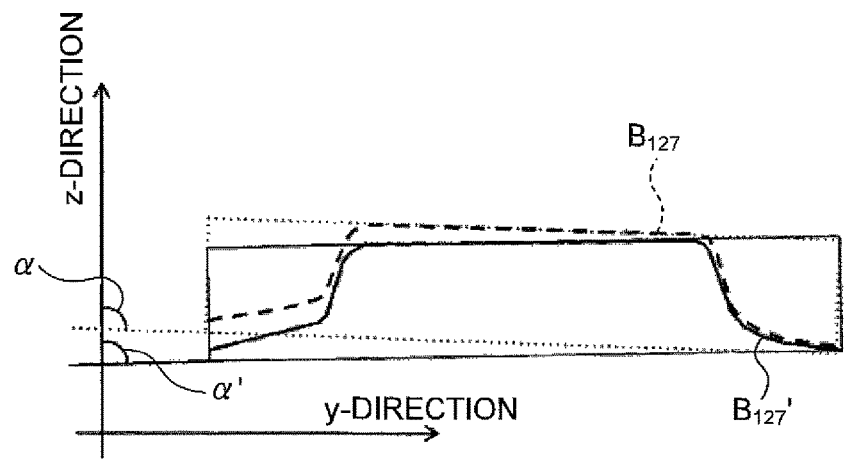
FIG. 8 is an explanatory diagram illustrating a sectional shape direction obtaining step of the springback amount evaluation method according to the embodiment of the present invention.

Next, with respect to a long side direction of the smallest rectangle circumscribing each sectional shape, which is another example of a direction of each sectional shape, a case where long side directions of the smallest rectangles circumscribing the sectional shapes $B_{127}$ and $B_{127}'$ (see FIG. 7C) in the section plane $A_{127}$ are obtained will be described as an example, with reference to FIG. 8. In FIG. 8, the smallest rectangle circumscribing the sectional shape before the die release (the sectional shape indicated by the dotted line) is indicated by a small dotted line. Further, the smallest rectangle circumscribing the sectional shape after the die release (the sectional shape indicated by the solid line) is indicated by a fine solid line. If a direction of each sectional shape is expressed by an angle formed between the long side direction of the rectangle and the z-direction, the direction of the sectional shape $B_{127}$ before the die release is $\alpha$ [°] and the direction of the sectional shape $B_{127}'$ after the die release is a' [°].

As described above, since the sectional shape direction obtaining means 17 obtains a direction of each sectional shape based on the whole of that sectional shape, even if the sectional shape has deformed minutely, the amount of that deformation is negligible. Therefore, this technique is applicable to most sectional shapes.

In the above example, even if the sectional shape is deformed after the die release, the amount of that deformation is minute enough to not largely change the direction of the principal axis of the second moment of area, and thus there is a presumption that the influence exerted by the deformation of the sectional shape on the direction of the sectional shape is negligible. However, like in a case where a sectional shape is an ellipse shape close to a perfect circle, or the like, depending on the shape of the section, the direction in which the second moment of area or section modulus indicates the maximum value or minimum value may be changed by the deformation.

This point will be more specifically described. If a ratio of the maximum value of the second moment of area or section modulus of a certain sectional shape of a shape before springback (or a targeted shape) to the minimum value thereof (maximum value/minimum value) is less than "1.1", the direction indicating the maximum value and the direction indicating the minimum value may be switched over after the springback. That is, the sectional shape may be determined as having rotated by 90 degrees by the deformation. Therefore, the ratio of the maximum value of the second moment of area or section modulus in a sectional shape before springback to the minimum value thereof (maximum value/minimum value) is preferably equal to or greater than "1.1". This ratio of the maximum value to the minimum value (maximum value/minimum value) is preferably equal to or greater than "1.2". Such a ratio of the maximum value to the minimum value (maximum value/minimum value) does not need to be achieved by all of the section planes in order to evaluate the amount of springback, and is preferably achieved by 70% or more of the section planes.

<Position Identifying Point Coordinate Obtaining Means>

The position identifying point coordinate obtaining means 19 finds, for each sectional shape set by the sectional shape obtaining means 15, coordinates of a position identifying point (for example, the center of gravity) where a position of the sectional shape is identified. The sectional shape direction obtaining means 17 is for evaluating an amount of torsion. On the contrary, if an amount of camber is evaluated as the amount of springback, the position identifying point coordinate obtaining means 19 is used. Camber is able to be perceived as deformation within the same plane of a press forming product.

As described above, each sectional shape is minute enough to not largely change the direction of the principal axis of the second moment of area after the die release, and the influence given by the deformation of the sectional shape on the position of the center of gravity is negligible in many cases. Therefore, if coordinates of centers of gravity are respectively found and compared with each other for the sectional shape of the shape to be the reference and the sectional shape after the die release, an amount of movement of the sectional shape is able to be obtained. By performing such comparison of centers of gravity for the whole of the press forming product, how much camber has occurred in the press forming product is able to be evaluated.

Figure 9:
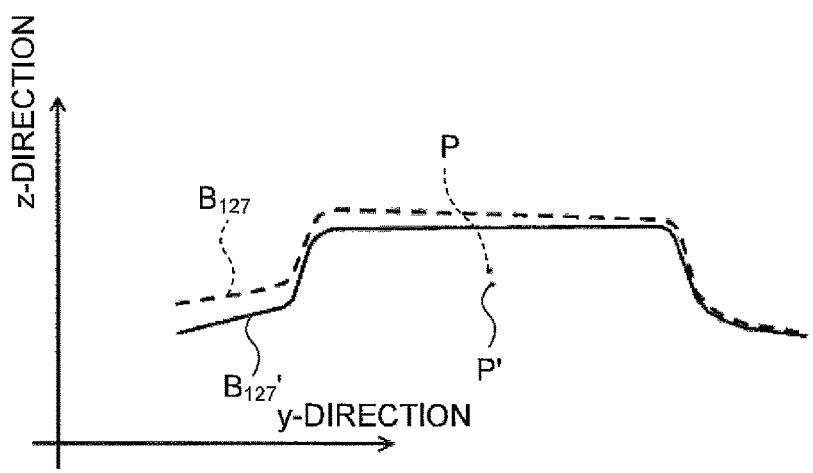
FIG. 9 is an explanatory diagram illustrating a position identifying point coordinate obtaining step of the springback amount evaluation method according to the embodiment of the present invention.

FIG. 9 is a diagram illustrating the center of gravity "P" in the sectional shape $B_{127}$ (see FIG. 7C) before the die release and the center of gravity "P'" in the sectional shape $B_{127}'$ after the die release, for the section plane $A_{127}$. As illustrated in FIG. 9, the center of gravity in the sectional shape has moved downward in FIG. 9 after the die release. By comparing the coordinates of the center of gravity "P" and the coordinates of the center of gravity "P'" like this, how much the sectional shape has moved is able to be found.

A method of evaluating an amount of springback with the outer part 21 being the target, by using the springback amount evaluation apparatus 1 of this embodiment configured as above will be described, together with operations (FIG. 1) of the springback amount evaluation apparatus 1 (FIG. 2).

<Section Plane Setting Step>

First, the section plane setting means 13 sets cross planes for a shape to be a reference of the outer part 21 and a shape after the die release (S1). In this example, as the shape to be a reference, a shape of the outer part 21 before the die release was used.

<Sectional Shape Obtaining Step>

Next, the sectional shape obtaining means 15 obtains a sectional shape of the outer part 21 for each of the set section planes (S3).

<Sectional Shape Direction Obtaining Step>

Next, the sectional shape direction obtaining means 17 obtains, for each sectional shape obtained in the sectional shape obtaining step S3, an orientation of the sectional shape in the section plane as a direction of the sectional shape (S5). In this example, in order to evaluate an amount of torsion, a direction in which the second moment of area indicates the maximum value is obtained as the direction of the sectional shape.

<Springback Amount Evaluation Step>

Figure 10:
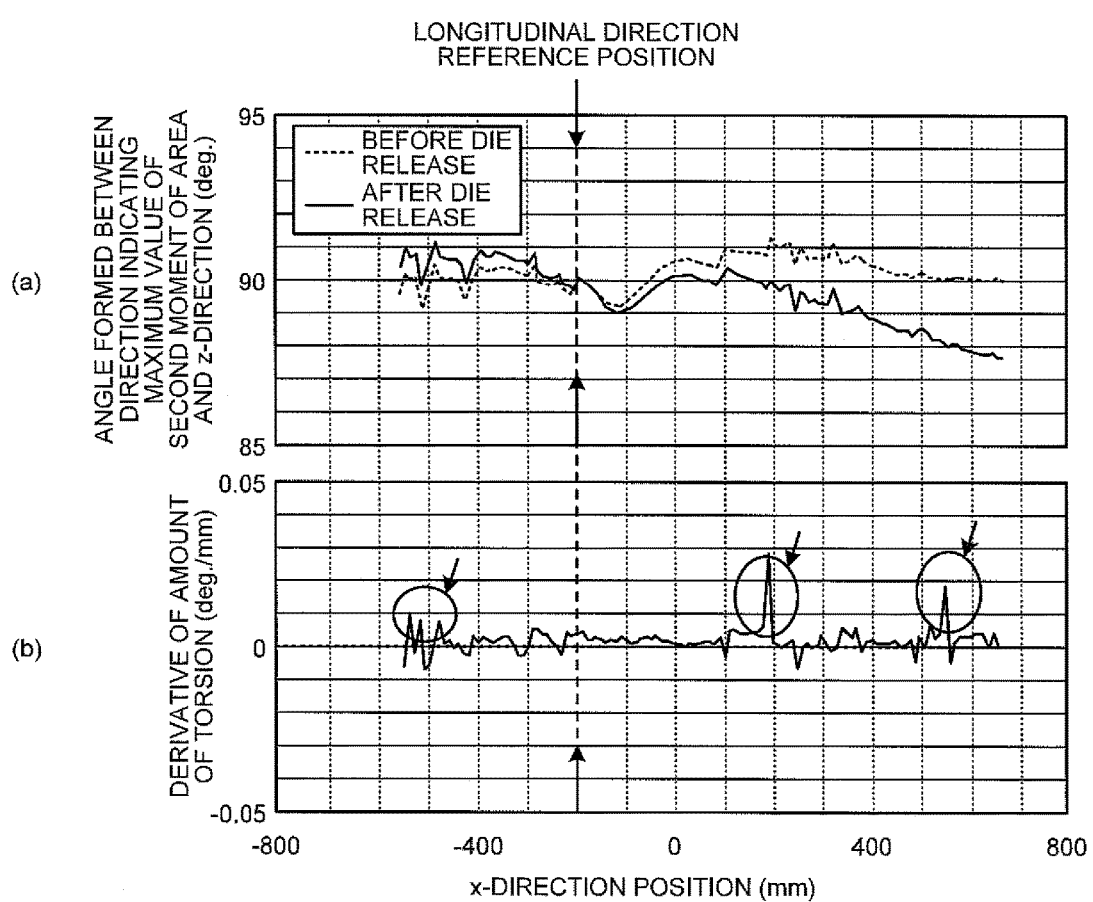
FIG. 10 is a diagram illustrating a result of the sectional shape direction obtaining step of the springback amount evaluation method according to the embodiment of the present invention and is a diagram graphically illustrating an amount of springback (amount of torsion) of the press forming product of FIG. 3.

Next, an operator evaluates an amount of springback by comparing directions of the sectional shape for the shape to be a reference and the shape after the die release, which are obtained in the sectional shape direction obtaining step S5 above, for all of the section planes (S9). In this embodiment, as illustrated in FIG. 10, a graph is generated for an angle formed between the direction indicating the maximum value of the second moment of area and the z-direction for each section plane, in order to make the amount of springback to be able to be visually grasped. In this embodiment, the generation of the graph was performed by the operator using a PC, but the generation of the graph may be automatically performed by providing a means for performing the springback amount evaluation step S9 in the PC.

In FIGS. 10(*a*) and (*b*), the dotted line represents a graph for the shape before the die release and the solid line represents a graph for the shape after the die release. In FIG. 10(*a*), the horizontal axis indicates the x-direction position [mm] and the vertical axis indicates the angle formed between the direction indicating the maximum value of the second moment of area and the z-direction. At the longitudinal direction reference position, the angles on the vertical axis before and after the die release are the same. In FIG. 10(*a*), overall, the graphs for before and after the die release are diverged from each other. As a result, it is understood that torsion has occurred over the whole longitudinal direction of the outer part 21.

In FIG. 10(*b*), the horizontal axis indicates the x-direction position [mm] and the vertical axis indicates the difference between the angles on the vertical axis of FIG. 10(*a*) for the shapes before and after the die release, that is, a value [deg./mm] obtained by calculating a derivative of the amount of torsion. By such a graph, at which position of the outer part 21 a large deformation has occurred after the die release is able to be understood. In FIG. 10(*b*), at encircled portions indicated with arrows (where the x-direction positions are around −500 mm, around 200 mm, and around 550 mm), the graph increases and decreases suddenly. This means that torsion has occurred largely at these positions.

<Position Identifying Point Coordinate Obtaining Step>

Figure 11:
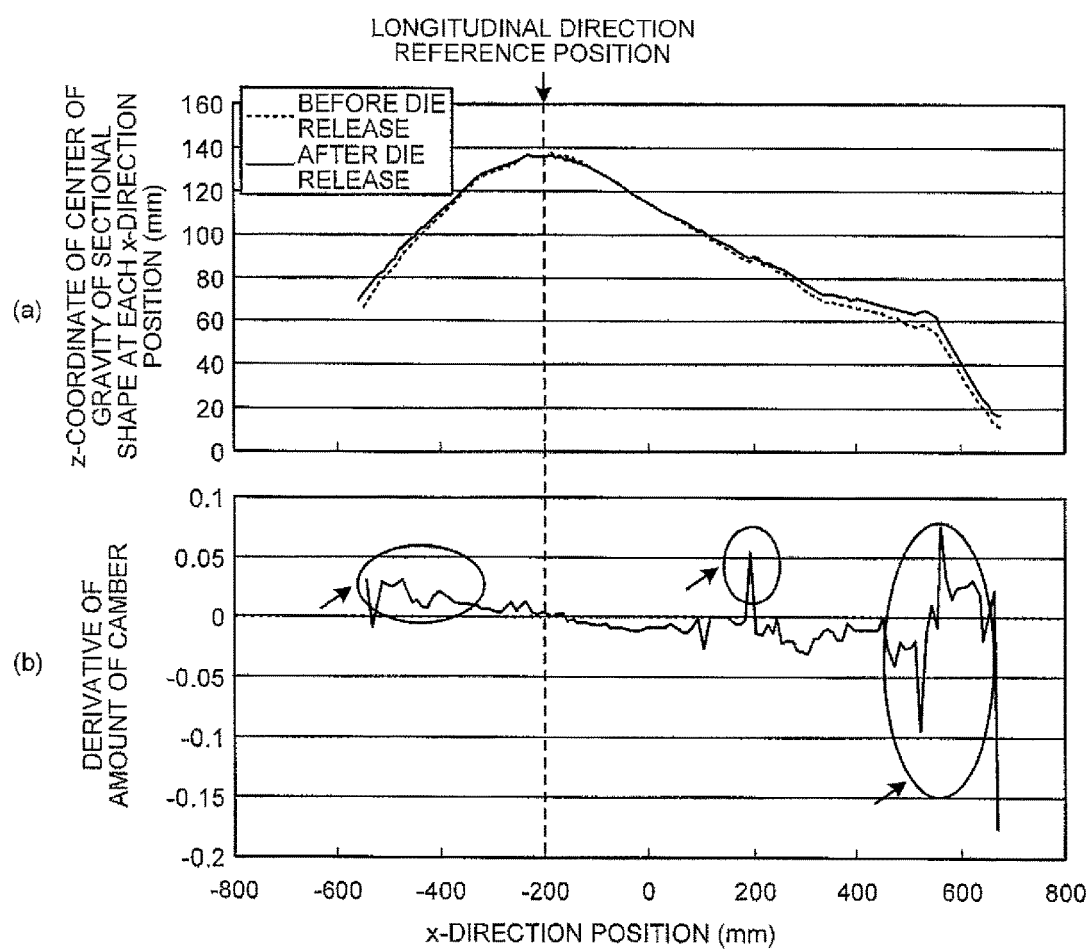
FIG. 11 is a diagram illustrating a result of the position identifying point coordinate obtaining step of the springback amount evaluation method according to the embodiment of the present invention and is a diagram graphically illustrating an amount of springback (amount of camber) of the press forming product of FIG. 3.

Further, the position identifying point coordinate obtaining means 19 obtains, for each sectional shape obtained in the sectional shape obtaining step S3, the center of gravity, which is a position identifying point of the sectional shape (position identifying point coordinate obtaining step S7). FIG. 11 graphically illustrates results thereof. In FIGS. 11(*a*) and (*b*), the dotted line is a graph for the shape before the die release and the solid line is a graph for the shape after the die release. In FIG. 11(*a*), the horizontal axis indicates the x-direction position [mm] and the vertical axis indicates the z-direction position [mm] of the center of gravity of the sectional shape at each x-direction position. As illustrated in FIG. 11(*a*), the more away from the longitudinal direction reference position, the more separated upwards the graph of the solid line is from the graph of the dotted line. This indicates that camber has occurred in the z-direction of the outer part 21 after the die release.

In FIG. 11(*b*), the horizontal axis indicates the x-direction position [mm] and the vertical axis indicates the difference between the z-direction positions of the shapes before and after the die release, that is, the value obtained by differentiating the amount of camber. By such a graph, at which position of the outer part 21 a large camber has occurred after the die release is able to be understood. In FIG. 11(*b*), at circled portions indicated with arrows (where the x-direction positions are around −400 mm, around 200 mm, and between 550 mm and 700 mm), the graph increases and decreases suddenly. This means that camber has occurred largely at these positions.

As described above, in this embodiment, sectional shapes of a press forming product in section planes set in a predetermined direction at predetermined intervals are obtained, an orientation of the sectional shape in the section plane is obtained for each sectional shape as a direction of the sectional shape, and the obtained directions are compared for all of the sectional shapes. As a result, an amount of springback that has occurred in the whole press forming product is able to be grasped and evaluation of the amount of springback is able to be performed objectively based on an objective index independently of judgment by an operator. Therefore, based on evaluation of an amount of springback obtained as described above, appropriate countermeasures against the springback are able to be implemented.

According to the above description, in order to measure an amount of torsion, a direction indicating the maximum value or minimum value of the second moment of area, the direction indicating the maximum value or minimum value of the section modulus, or the long side direction of the smallest rectangle circumscribing the sectional shape was found, but it may be anything as long as it is a direction obtained based on the sectional shape. Further, in the position identifying point coordinate obtaining step S7, the center of gravity of the sectional shape is found as the position identifying point, but not being limited to the center of gravity, it may be anything as long as it is an identifying point where a position obtained by the same standard based on the sectional shape is identified.

Figure 12:
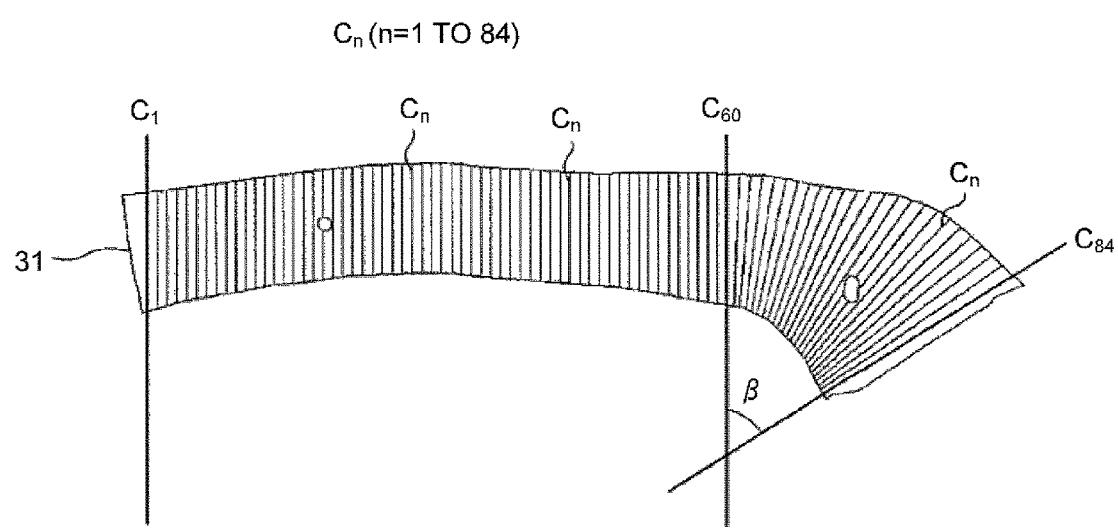
FIG. 12 is an explanatory diagram illustrating a case where the sectional shape obtaining step of the springback amount evaluation method according to the embodiment of the present invention has been applied to a part different from the press forming product of FIG. 3.

The method of setting the section planes by the section plane setting means 13 has been described by exemplifying a part (outer part 21) that is linear overall, but based on FIG. 12, a specific example of a method of setting section planes for a bent part having a bent portion at a portion thereof will be described. FIG. 12 is a diagram illustrating a method of setting section planes for a bent part 31 having a linear portion and a bent portion. In this procedure, first, as illustrated in FIG. 12, for the bent part 31, three section planes $C_1$, $C_{60}$, and $C_{84}$, which become references, are set such that the linear portion and the bent portion are divided.

Next, a plurality of section planes are further set among the set section plane $C_1$, section plane $C_{60}$, and section plane $C_{84}$. Since the section plane $C_1$ and section plane $C_{60}$ are parallel to each other, a plurality of section planes are set therebetween in parallel and at equal intervals. Since the section plane $C_{60}$ and section plane $C_{84}$ are not parallel to each other, section planes are set by equally dividing an angle β formed between the section plane $C_{60}$ and section plane $C_{84}$. FIG. 12 exemplifies a case where between the section plane $C_{60}$ and the section plane $C_{84}$ has been equally divided into 24 parts. As described above, section planes are set over the whole bent part 31.

Working Example

An experiment was carried out, for checking a change in the amount of springback after implementing countermeasures against the springback based on results of the evaluation of the amount of springback obtained in the above described embodiment. Results of this experiment will be described below. In this experiment, based on the results of the evaluation of the amount of springback obtained in the above described embodiment, dies were changed as follows for portions corresponding to portions where the torsion and the camber are large. First, a die shape used in the first press forming was changed to partially give an embossed shape to the outer part 21. Further, by changing a die shape used in the second press forming, the embossed shape given in the first press forming was crushed to add compressive stress thereto, and a bearing surface was partially added to the outer part 21 to give tensile stress thereto.

Figure 13:
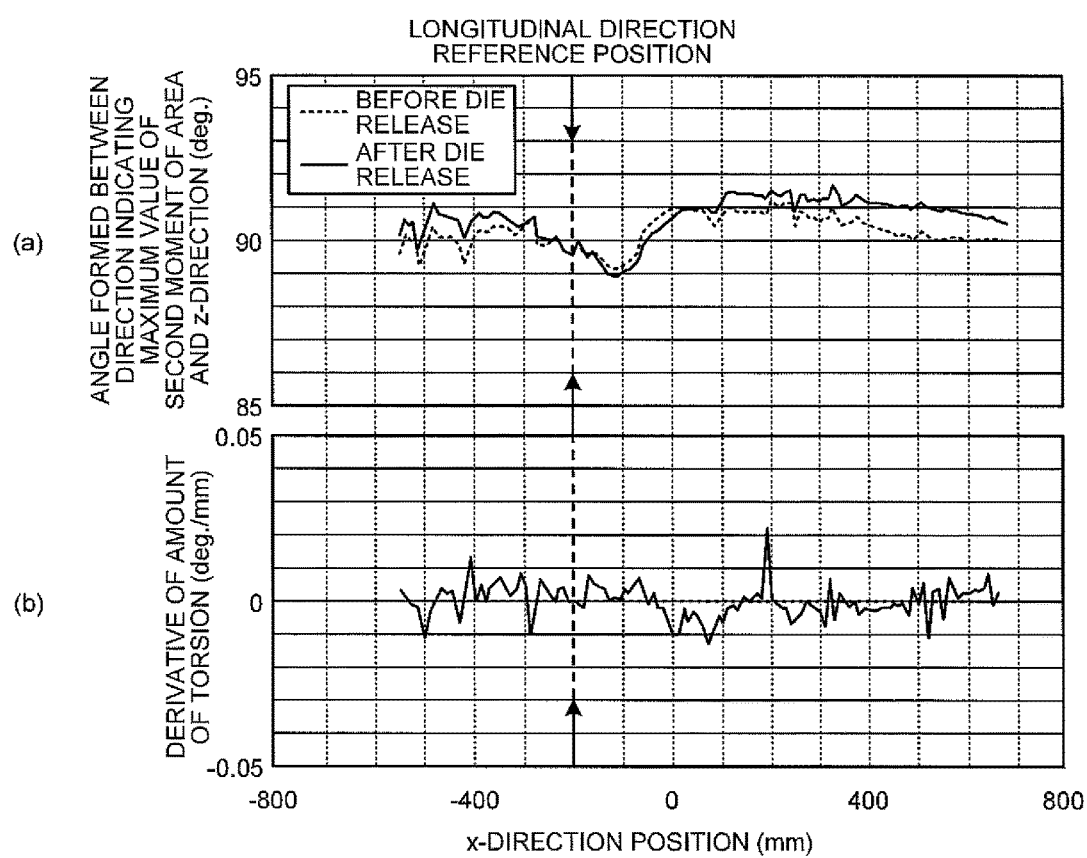
FIG. 13 is a diagram illustrating a result of the sectional shape direction obtaining step of the springback amount evaluation method in a working example, and is a diagram graphically illustrating an amount of springback (amount of torsion) of the press forming product of FIG. 3 after a springback countermeasure.
Figure 14:
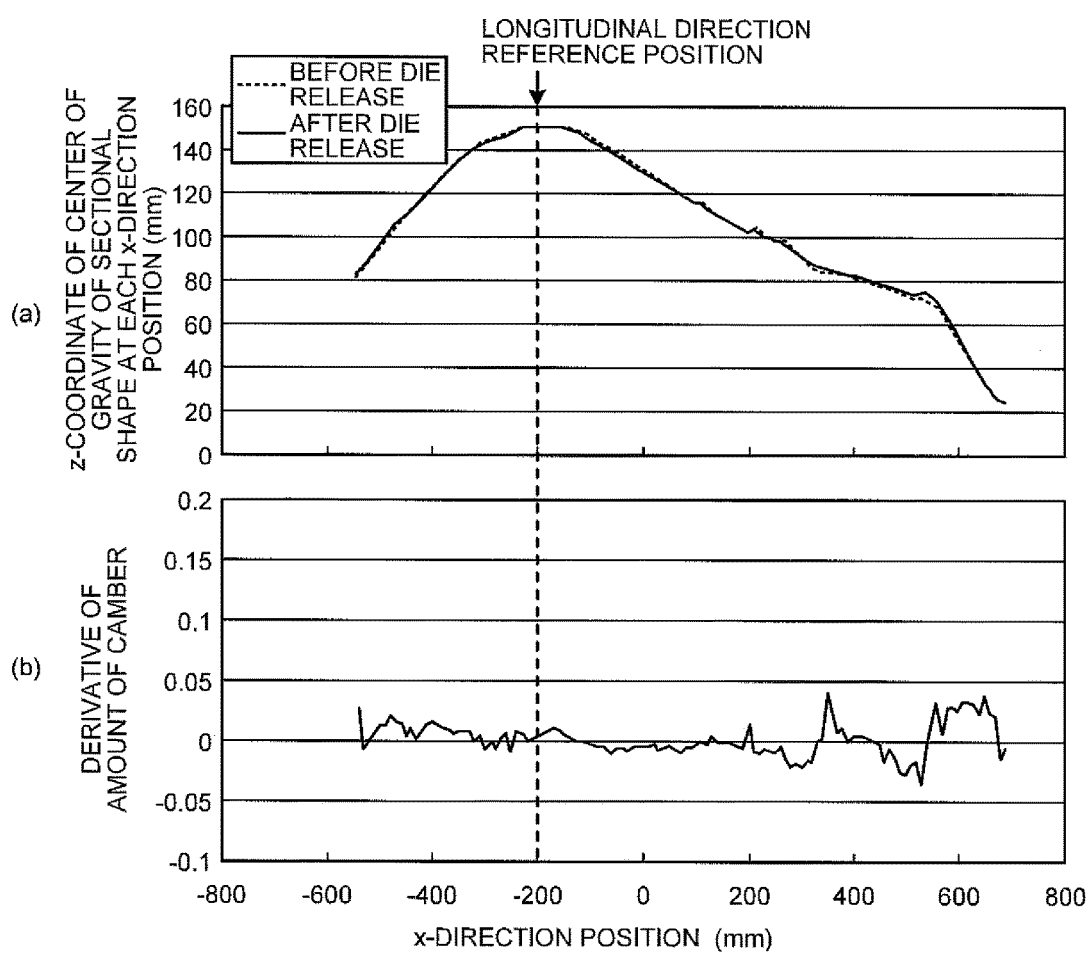
FIG. 14 is a diagram illustrating a result of the position identifying point coordinate obtaining step of the springback amount evaluation method in the working example, and is a diagram graphically illustrating an amount of springback (amount of camber) of the press forming product of FIG. 3 after the springback countermeasure.

For the outer part 21 obtained by a press forming method implemented with the above described countermeasures against springback, the evaluation by the springback amount evaluation method according to the present invention was performed again. The results are illustrated in FIG. 13 and FIG. 14. FIG. 13 is, similarly to FIG. 10, a graph representing torsion of the outer part 21. FIG. 14 is, similarly to FIG. 11, a graph representing camber of the outer part 21. The horizontal axes and vertical axes of FIG. 13 and FIG. 14 are similar to the horizontal axes and vertical axes of FIG. 10 and FIG. 11, and thus description thereof will be omitted.

In FIG. 13(*a*), as compared with FIG. 10(*a*), the divergence between the graph before the die release and the graph after the die release is smaller. This indicates that the torsion was improved. In FIG. 14(*a*), the graph before the die release and the graph after the die release coincide with each other very well, indicating that camber hardly occurred. As a result, it was confirmed that the camber was remarkably improved by the countermeasures against springback.

As described, by the springback amount evaluation method according to the present invention, an amount of springback is able to be evaluated based on an objective index independently of judgment by an operator and appropriate countermeasures against springback were proven to be able to be implemented.

INDUSTRIAL APPLICABILITY

The present invention is applicable to a process for evaluating an amount of springback after die release of a press forming product manufactured by press forming a metal sheet, and thus appropriate countermeasures against the springback are able to be implemented.

REFERENCE SIGNS LIST $A_n$, $C_n$ Section plane
$B_5$, $B_{70}$, $B_{127}$ Sectional shape before die release, $B_5'$, $B_{70}'$, $B_{127}'$ Sectional shape after die release
L Reference axis
P, P' Center of gravity
1 Springback amount evaluation apparatus
3 Display device
5 Input device
7 Main storage device
9 Auxiliary storage device
11 Arithmetic processing unit
13 Section plane setting means
15 Sectional shape obtaining means
17 Sectional shape direction obtaining means
19 Position identifying point coordinate obtaining means
21 Outer part
23 Top die
25 Bottom die
27 Blank holder
29 Blank material
31 Bent part

The invention claimed is:

1. A method of manufacturing a press forming product, comprising:
    forming the press forming product by press forming a metal sheet with a die;
    evaluating a springback amount after die release of the press forming product by a computer; and
    implementing countermeasures against the springback amount based on the evaluation,
    wherein evaluating the springback amount includes:
    finding a shape to be a reference of the press forming product and a shape after the die release by an analysis using the computer or by actually performing three dimensional shape measurement; and
    executing a predetermined program, the predetermined program executed by a processor of the computer, as follows:
        setting, with respect to the shape to be the reference of the press forming product and the shape after the die release, a plurality of section planes intersecting a shape of the press forming product at predetermined intervals and parallel to one another, the plurality of section planes being set on the computer;
        obtaining a sectional shape of the press forming product for each of the set section planes; and
        obtaining an orientation of each of the sectional shapes in each section plane as a direction of each of the sectional shapes,
    in which for each of the shape to be the reference of the press forming product and the shape after the die release, the section plane setting step, the sectional shape obtaining step, and the sectional shape direction obtaining step are performed,
    the amount of springback is evaluated from an amount of torsion defined as a deformation by rotation of the sectional shapes about an axis by comparing, for all of the section planes, the obtained directions of the sectional shapes for the shape to be the reference and for the shape after the die release, and by obtaining a rotational angle of each sectional shape of the section planes and comparing the rotational angle of each sectional shape for all of the obtained sectional shapes, and
    a direction of each of the sectional shapes in the each section plane is a direction in which a second moment of area in the sectional shape indicates a maximum value or minimum value, a direction in which a section modulus in the sectional shape indicates a maximum value or minimum value, or a long side direction or a short side direction of a smallest rectangle circumscribing the sectional shape.

2. The method according to claim 1, wherein the shape to be the reference of the press forming product is any one of a shape of the press forming product before the die release, a shape of a die, or a targeted shape after press forming.

3. The method according to claim 1, wherein the shape of the press forming product after the die release is a shape obtained as a result of performing a springback analysis on the press forming product, or a shape obtained as a result of actually performing press forming.

4. The method according to claim 1, wherein for 70% or more of the set plurality of section planes, a ratio of the maximum value of the second moment of area or section modulus to the minimum value thereof is equal to or greater than 1.1.

5. A method of manufacturing a press forming product, comprising:
  forming the press forming product by press forming a metal sheet with a die;
  evaluating a springback amount after die release of the press forming product by a computer; and
  implementing countermeasures against the springback amount based on the evaluation,
  wherein evaluating the springback amount includes:
  finding a shape to be a reference of the press forming product and a shape after the die release by an analysis using the computer or by actually performing three dimensional shape measurement; and
  executing a predetermined program, the predetermined program executed by a processor of the computer, as follows:
    setting, with respect to the shape to be the reference of the press forming product and the shape after the die release, a plurality of section planes intersecting a shape of the press forming product at predetermined intervals and parallel to one another, the plurality of section planes being set on the computer;
  obtaining a sectional shape of the press forming product for each of the set section planes; and
  obtaining a position identifying point coordinate where a position of each of the sectional shapes in each section plane is identified,
  in which for each of the shape to be the reference of the press forming product and the shape after the die release, the section plane setting step, the sectional shape obtaining step, and the position identifying point coordinate obtaining step are performed,
  the amount of springback is evaluated from an amount of camber that is defined as a deformation within a same plane of the press forming product by comparing, for all of the section planes, the obtained position identifying point coordinates for the shape to be the reference and the shape after the die release, and by obtaining an amount of movement of each sectional shape of the section planes and comparing the amount of movement of each sectional shape for all of the obtained sectional shapes, and
  the position identifying point is a coordinate of a center of gravity of the sectional shape.

6. The method according to claim 5, wherein the shape to be the reference of the press forming product is any one of a shape of the press forming product before the die release, a shape of a die, or a targeted shape after press forming.

7. The method according to claim 5, wherein the shape of the press forming product after the die release is a shape obtained as a result of performing a springback analysis on the press forming product, or a shape obtained as a result of actually performing press forming.

8. The method according to claim 5, wherein a direction of the each of the sectional shapes in the each section plane is a direction in which a second moment of area in the sectional shape indicates a maximum value or minimum value, or a direction in which a section modulus in the sectional shape indicates a maximum value or minimum value.

9. The method according to claim 5, wherein a direction of the each of the sectional shapes in the each section plane is a long side direction or a short side direction of a smallest rectangle circumscribing the sectional shape.

10. The method according to claim 8, wherein for 70% or more of the set plurality of section planes, a ratio of the maximum value of the second moment of area or section modulus to the minimum value thereof is equal to or greater than 1.1.

\* \* \* \* \*